United States Patent
Krishnaswamy et al.

(10) Patent No.: US 7,363,615 B2
(45) Date of Patent: Apr. 22, 2008

(54) STACK-BASED CALLBACKS FOR DIAGNOSTIC DATA GENERATION

(75) Inventors: Ravinder Patnam Krishnaswamy, San Francisco, CA (US); Ashok Kumar Gadangi, San Rafael, CA (US); Davis C. Augustine, San Francisco, CA (US)

(73) Assignee: Autodesk, Inc., San Rafael, CA (US)

( * ) Notice: Subject to any disclaimer, the term of this patent is extended or adjusted under 35 U.S.C. 154(b) by 468 days.

(21) Appl. No.: 10/799,214

(22) Filed: Mar. 12, 2004

(65) Prior Publication Data

US 2005/0204180 A1   Sep. 15, 2005

(51) Int. Cl.
*G06F 9/44* (2006.01)
(52) U.S. Cl. .................................. 717/124; 714/38
(58) Field of Classification Search ................ 717/124; 714/38
See application file for complete search history.

(56) References Cited

U.S. PATENT DOCUMENTS

| | | | |
|---|---|---|---|
| 5,918,004 A * | 6/1999 | Anderson et al. ............. 714/38 |
| 5,948,113 A * | 9/1999 | Johnson et al. ............... 714/38 |
| 6,651,243 B1 * | 11/2003 | Berry et al. ................. 717/130 |
| 6,785,848 B1 * | 8/2004 | Glerum et al. ................ 714/38 |
| 6,839,892 B2 * | 1/2005 | Dawkins et al. ............. 717/124 |
| 2003/0005414 A1 * | 1/2003 | Elliott et al. ................ 717/128 |
| 2004/0059964 A1 * | 3/2004 | Grover et al. ................ 714/47 |

* cited by examiner

*Primary Examiner*—Wei Zhen
*Assistant Examiner*—Phillip H Nguyen
(74) *Attorney, Agent, or Firm*—Gates & Cooper LLP

(57) ABSTRACT

A method, apparatus, and article of manufacture for implementing a stack-based callback in a software program to acquire diagnostic information. The five phases of the logic include Registration, Stack Determination, Callback Notification, Callback Processing and Diagnostic Data Packaging.

18 Claims, 2 Drawing Sheets

STACK-BASED CALLBACKS FOR DIAGNOSTIC DATA GENERATION

BACKGROUND OF THE INVENTION

1. Field of the Invention

The present invention generally relates to a system for diagnosing program failure, and, in particular, to a stack-based callback scheme for diagnostic data generation.

2. Description of the Related Art

Software programs often fail by "crashing" or reaching error conditions that cause them to terminate. In order to improve product quality, it is important to diagnose the reasons for failure.

Operating systems often generate crash data for software programs, wherein the crash data can be analyzed in an attempt to diagnose the reasons for failure. For example, MICROSOFT WINDOWS operating systems create a "full dump" or "minidump" file, and UNIX or LINUX operating systems create a "core dump" file, when a program terminates due to unhandled error conditions.

It is well known for software program vendors to provide users with a set of tools for capturing and analyzing program crash data. In their simplest form, these tools comprise an error reporting mechanism that presents the users with an alert message that notifies them when a failure occurs and provides an opportunity to forward crash data to the vendor for further analysis. The vendor can then use the forwarded crash data to troubleshoot problems, ultimately leading to more robust and crash-resistant programs.

Often, the programs are sufficiently complex, so that even though the point of failure is known, the amount of information that captures the program's full state in the crash data is unmanageably large, e.g., 100's of Megabytes. Even then, the crash data may not contain all the information needed to diagnose the problem. For example, some of the information needed to diagnose the problem may be external to the program, e.g., stored in files. Also, the information needed to diagnose the problem is often only a small fraction of the crash data, e.g., 10's of Kilobytes. Although there are sometimes options to generate subsets of the program's full state in the crash data, such subsets are almost certain to miss critical diagnostic information.

The key point is that the crash data generated by an operating system is usually directed at a generic program, since the operating system does not know about specific internal logic and critical state data pertaining to the program.

Thus, there is a need in the art for a mechanism where the information to help diagnose the problem can be intelligently supplied by the program itself. Specifically, there is a need in the art for a mechanism that uses the program's knowledge of what information is relevant at the point of failure when providing the crash data to help diagnose the program. The present invention satisfies that need.

SUMMARY OF THE INVENTION

To address the requirements described above, the present invention discloses a method, apparatus, and article of manufacture for implementing a stack-based callback scheme in a software program to acquire diagnostic information. The five phases of the scheme include Callback Registration, Stack Determination, Stack-based Callback Notification, Callback Processing and Diagnostic Data Packaging.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention describes a mechanism to provide contextual diagnostic data at the point of failure of a software program by explaining the implementation logic of a stack-based callback scheme for diagnostic data generation. The goal of the present invention is a mechanism where the data to help diagnose the problem can be intelligently supplied by the program itself by building logic into the program to make use of the call stack context as much as possible in determining relevant diagnostic data. This means it also provides the ability for programs to include data external to the program, such as files.

Hardware and Software Environment

Figure 1:
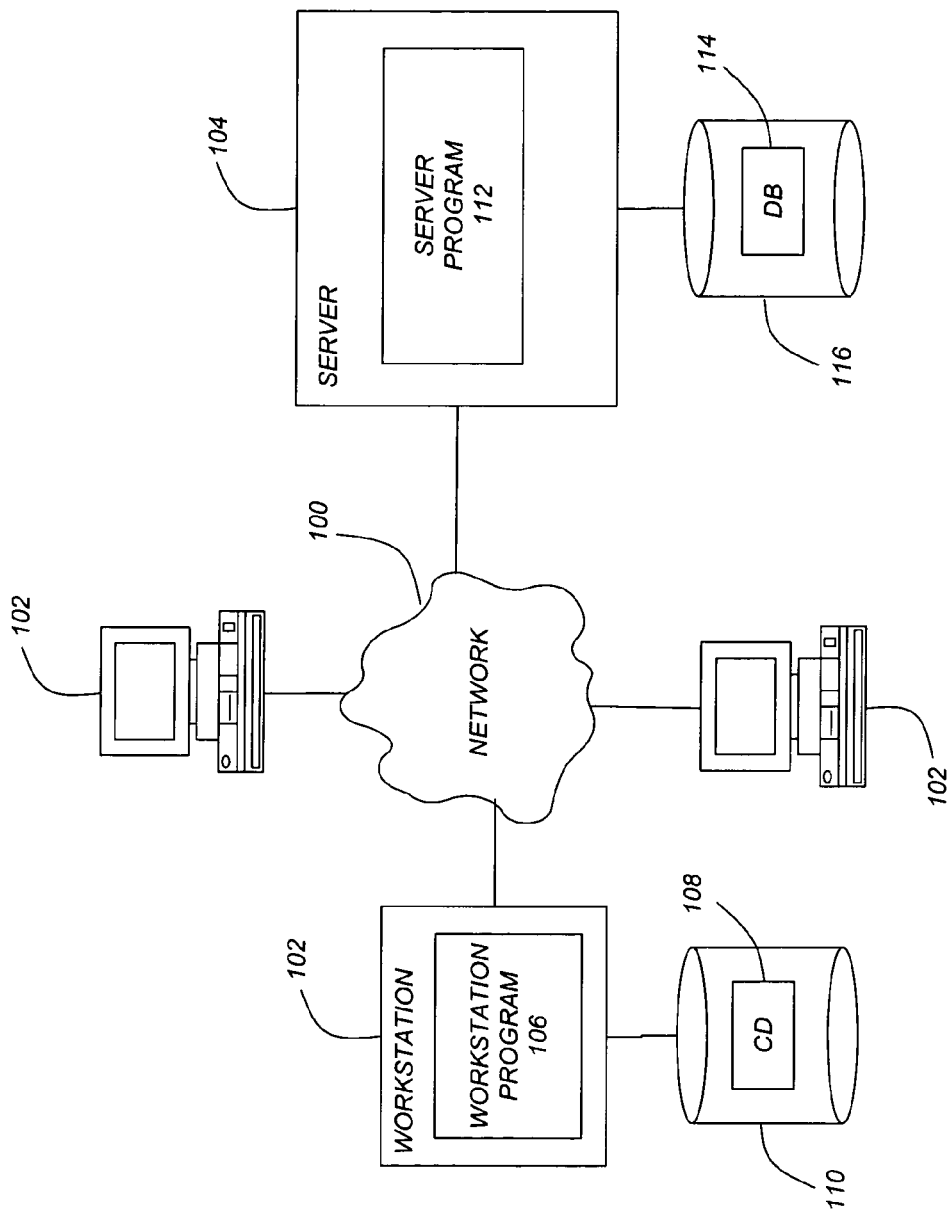
FIG. 1 schematically illustrates an exemplary hardware and software environment used in the preferred embodiment of the present invention.

FIG. 1 schematically illustrates an exemplary hardware and software environment used in the preferred embodiment of the present invention. The present invention is usually implemented using a network 100 to connect one or more workstations 102 to one or more server computers 104. A typical combination of resources may include workstations 102 that comprise personal computers, network computers, etc., and server computers 104 that comprise personal computers, network computers, workstations, minicomputers, mainframes, etc. The network 100 coupling these computers 102 and 104 may comprise a LAN, WAN, Internet, etc.

Generally, the present invention is implemented using one or more programs, files and/or databases that are executed and/or interpreted by the workstations 102. In the exemplary embodiment of FIG. 1, these programs and databases include one or more workstation programs 106 executed by one or more of the workstations 102, and context data 108 stored on a data storage device 110 accessible from the workstation 102. In addition, the environment often includes one or more server programs 112 executed by the server computer 104, and a crash database 114 stored on a data storage device 116 accessible from the server computer 104.

Each of the programs and/or databases comprise instructions and data which, when read, interpreted, and executed by their respective computers, cause the computers to perform the steps necessary to execute the steps or elements of the present invention. The programs and databases are usually embodied in or readable from a computer-readable device, medium, or carrier, e.g., a local or remote data storage device or memory device coupled to the computer directly or coupled to the computer via a data communications device.

Thus, the present invention may be implemented as a method, apparatus, or article of manufacture using standard programming and/or engineering techniques to produce software, firmware, hardware, or any combination thereof. The term "article of manufacture" (or alternatively, "computer program carrier or product") as used herein is intended to encompass one or more programs and/or databases accessible from any device, carrier, or media.

Of course, those skilled in the art will recognize that the exemplary environment illustrated in FIG. 1 is not intended to limit the present invention. Indeed, those skilled in the art will recognize that other alternative environments may be used without departing from the scope of the present invention.

Stack-Based Callback

Figure 2:
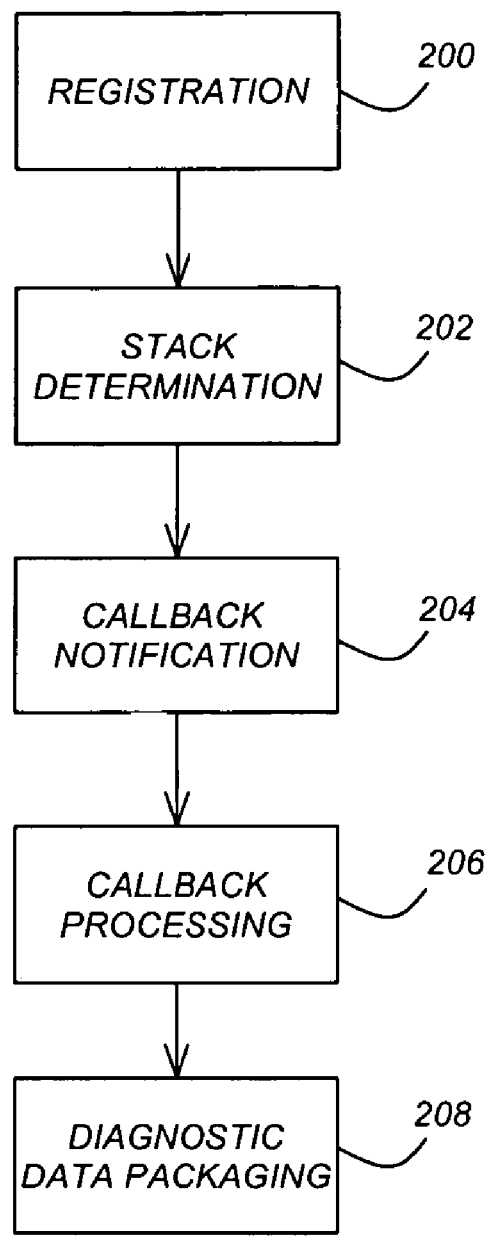
FIG. 2 is a flowchart that further illustrates the functions performed by a program according to the preferred embodiment of the present invention.

FIG. 2 is a flowchart that further illustrates the functions performed according to the preferred embodiment of the present invention. Specifically, the flowchart shows the five phases performed by the present invention to implement a stack-based callback in a program to acquire diagnostic information.

Block 200 represents the step of Registration. The program typically is comprised of different modules and sub-applications. This Block comprises registering callbacks for one or more of the different modules and sub-applications within the program when an address of a procedure or function within the modules and sub-applications is on a call stack upon the failure of the program. Generally, the Registration step is performed when the program starts, and when new modules and sub-applications are loaded by the program while the program is running.

Block 202 represents the step of Stack Determination. This Block comprises an error handler for the program that determines the call stack for the program at the point of failure of the program.

Block 204 represents the step of Callback Notification. This Block comprises the error handler for the program notifying the registered callbacks of the modules and sub-applications based on the examined call stack. In this Block, the error handler gives each module or sub-application that registered a callback function and is on the failure call stack an opportunity to include specific diagnostic information based on the call stack and based on the point of failure within the module or sub-application.

Block 206 represents the step of Callback Processing. This Block comprises the processing logic within the callbacks for the modules and sub-applications registered in Block 200 and invoked in Block 204. Each individual module and sub-application callback processing logic involves interpreting the failure call stack context supplied to the callback function and determining relevant contextual data to be supplied to the error handler of the program 106 for packaging in Block 208. The context data is generally extracted from stack data, heap data, global data and external data. The stack data is usually comprised of local variables as well as addresses of (i.e., references to) functions, variables and objects, while the external data may comprise files or any other kind of relevant data that a specific module or sub-application wants to attach as part of the context.

Block 208 represents the step of Diagnostic Data Packaging. This Block comprises the error handler for the program 106 packaging the context data supplied by the notified modules and sub-applications for examination and/or delivery. This Block may also include storing the packaged context data 108 on the data storage device 110 accessible from the workstation 102, transferring the packaged context data 108 from the program 106 to the server program 112, and/or storing the packaged context data 108 in the crash database 114 on the data storage device 116 accessible from the server computer 104.

CONCLUSION

This concludes the description of the preferred embodiment of the invention. The following describes some alternative embodiments for accomplishing the present invention.

For example, any type of computer, such as a mainframe, minicomputer, work station or personal computer, or network could be used with the present invention. In addition, any program, application or operating system could benefit from the present invention. It should also be noted that the specific programs described herein are not intended to limit the invention, but merely to provide examples.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for providing contextual diagnostic data at a point of failure of a software program, comprising:
   (a) registering one or more callback functions for each of one or more modules and sub-applications within the program;
   (b) examining a call stack for the program upon failure of the program;
   (c) notifying the registered callback functions for the modules and sub-applications based on the examined call stack, wherein an error handler gives each module or sub-application that registered a callback function and is on the examined call stack an opportunity to include specific diagnostic information based on the examined call stack and based on the point of failure within the module or sub-application;
   (d) performing callback processing, wherein the notified callback functions of the modules and sub-applications interpret the call stack's context supplied to the callback function, determine the contextual diagnostic data to be extracted and supplied to the error handler, and extract and supply the contextual diagnostic data;
   (e) packaging the contextual diagnostic data supplied by the notified callback functions of the modules and sub-applications; and
   (f) using the packaged contextual diagnostic data for further analysis in order to troubleshoot the point of failure of the software program.

2. The method of claim 1, wherein the registering step (a) comprises registering callbacks for the modules and sub-applications when an address of a procedure or function within the modules and sub-applications is on the call stack upon the failure of the program.

3. The method of claim 1, wherein the contextual diagnostic data is comprised of stack data, heap data, global data or external data.

4. The method of dawn 1, further comprising storing the packaged contextual diagnostic data.

5. The method of claim 1, further comprising transferring the packaged context data to a server computer.

6. The method of claim 5, further comprising storing the transferred, packaged contextual diagnostic data on the server computer.

7. An apparatus for providing contextual diagnostic data at a point of failure of a software program, comprising:
a computer; and
logic, performed by the computer, for:
(a) registering one or more callback functions for each of one or more modules and sub-applications within the program;
(b) examining a call stack for the program upon failure of the program;
(c) notifying the registered callback functions for the modules and sub-applications based on the examined call stack, wherein an error handler gives each module or sub-application that register a callback function and is on the examined call stack an opportunity to include specific diagnostic information based on the examined call stack and based on the point of failure within the module or sub-application;
(d) performing callback processing, wherein the notified callback functions of the modifies and sub-applications interpret the call stack's context supplied to the callback function, determine the contextual diagnostic data to be extracted and supplied to the error handler, and extract and supply the contextual diagnostic data;
(e) packaging the contextual diagnostic data supplied by the notified callback functions of the modules and sub-applications; and
(f) using the packaged contextual diagnostic data for further analysis in order to troubleshoot the point of failure of the software program.

8. The apparatus of claim 7, wherein the logic for registering (a) comprises logic for registering callbacks for the modules and sub-applications when an address of a procedure or function within the modules and sub-applications is on the call stack upon the failure of the program.

9. The apparatus of claim 7, wherein the contextual diagnostic data is comprised of stack data, heap data, global data or external data.

10. The apparatus of claim 7, further comprising logic for storing the packaged contextual diagnostic data.

11. The apparatus of claim 7, further comprising logic for transferring the packaged contextual diagnostic data to a server computer.

12. The apparatus of claim 11, further comprising logic for storing the transferred, packaged contextual diagnostic data on the server computer.

13. An article of manufacture comprising a program storage device embodying instructions that, when read and executed by a computer, cause the computer to perform a method for providing contextual diagnostic data at a point of failure of a software program, comprising:
(a) registering one or more callback functions for each of one or more modules and sub-applications within the program;
(b) examining a call stack for the program upon failure of the program;
(c) notifying the registered callback functions for the modules and sub-applications based on the examined call stack, wherein an error handler gives each module or sub-application that registered a callback function and is on the examined call stack an opportunity to include specific diagnostic information based on the examined call stack and based on the point of failure within the module or sub-application;
(d) performing callback processing, wherein the notified callback functions of the modules and sub-applications interpret the call stack's context supplied to the callback function, determine the contextual diagnostic data to be extracted and supplied to the error handler, and extract and supply the contextual diagnostic data;
(e) packaging the contextual diagnostic data supplied by the notified callback functions of the modules and sub-applications; and
(f) using the packaged contextual diagnostic data for further analysis in order to troubleshoot the point of failure of the software program.

14. The article of claim 13, wherein the registering step (a) comprises registering callbacks for the modules and sub-applications when an address of a procedure or function within the modules and sub-applications is on the call stack upon the failure of the program.

15. The article of claim 13, wherein the contextual diagnostic data is comprised of stack data, heap data, global data or external data.

16. The article of claim 13, farther comprising storing the packaged contextual diagnostic data.

17. The article of claim 13, further comprising transferring the packaged contextual diagnostic data to a server computer.

18. The article of claim 17, further comprising storing the transferred, packaged contextual diagnostic data on the server computer.

* * * * *

UNITED STATES PATENT AND TRADEMARK OFFICE
CERTIFICATE OF CORRECTION

| | | |
|---|---|---|
| PATENT NO. | : 7,363,615 B2 | Page 1 of 1 |
| APPLICATION NO. | : 10/799214 | |
| DATED | : April 22, 2008 | |
| INVENTOR(S) | : Ravinder P. Krishnaswamy et al. | |

It is certified that error appears in the above-identified patent and that said Letters Patent is hereby corrected as shown below:

In the Claims

Column 4, line 61, Claim 4, please delete the word "dawn" and replace with the word --claim--.

Column 5, line 19, Claim 7(d), please delete the word "modifies" and replace with the word --modules--.

Signed and Sealed this
Thirteenth Day of May, 2014

Michelle K. Lee
*Deputy Director of the United States Patent and Trademark Office*